United States Patent

Rekiere

[15] 3,637,941

[45] Jan. 25, 1972

[54] INTEGRATED SWITCHING AND TRANSMISSION NETWORK FOR PULSE CODE MODULATED SIGNALS

[72] Inventor: Bernard J. Rekiere, Addison, Ill.

[73] Assignee: GTE Automatic Electric Laboratories Incorporated, Northlake, Ill.

[22] Filed: July 13, 1970

[21] Appl. No.: 54,481

[52] U.S. Cl. ..........179/15 AQ
[51] Int. Cl. ..........H04j 3/00
[58] Field of Search ..........179/15 AQ, 15 AT, 15 BA, 15 BS, 179/15 AC, 15 BW

[56] References Cited

UNITED STATES PATENTS 3,458,659 7/1969 Sternung ..........179/15 AQ
3,226,687 12/1965 Amdahl et al. ..........179/15 AT
3,466,397 9/1969 Benowitz et al. ..........179/15 BS

FOREIGN PATENTS OR APPLICATIONS

41/6376 4/1966 Japan ..........179/15 AQ

*Primary Examiner*—Kathleen H. Claffy
*Assistant Examiner*—David L. Stewart
*Attorney*—Cyril A. Krenzer, K. Mullerheim, B. E. Franz and Robert J. Black

[57] ABSTRACT

A time-division multiplex switching network and associated control. The network is capable of accepting digitally multiplexed carrier signals, performing the necessary functions of frame aligning, channel switching and channel reassigning required by an integrated switching and transmission system. To overcome blocking, time slot interchange capability is provided by allowing selective access to common storage locations via the switching network.

8 Claims, 7 Drawing Figures

INVENTOR
BERNARD J. REKIERE
BY [signature]
AGENT

INTEGRATED SWITCHING AND TRANSMISSION NETWORK FOR PULSE CODE MODULATED SIGNALS

BACKGROUND OF THE INVENTION

This invention relates generally to switching techniques in telephone communication systems and more particularly to the switching of pulse code modulated signals on a time-division multiplex basis.

Pulse code modulation has become increasingly important in the telephone industry as a transmission technique for reducing costs by permitting a multiplicity of conversations to be transmitted over a single channel. Translation of an analog signal into pulse code modulation begins by switching sequentially from one channel to another at a rapid rate, each channel occupying the transmission line for a fraction of the total time. Conversations thus are stacked in time rather than in frequency as in conventional frequency division multiplex carrier systems. This method is referred to as time-division multiplexing. By synchronizing the sampling rate at the receive end each channel may be recreated in its original form. If periodic samples of a waveform are taken often enough the waveform can be perfectly reconstructed at the end terminal. The necessary sampling rate is usually twice that of the highest frequency to be transmitted. Therefore, if 4,000 Hz. is the highest frequency on a telephone channel, samples taken at a rate of 8,000 Hz. will precisely and exactly duplicate the telephone conversation.

Three successive operations are usually employed to transform the analog speech signal into a series of digitally coded pulses. The first operation is to sample the speech signal at a suitable rate and measure the amplitude of the signal. This results in a train of pulses roughly analogous to the original waveform. Next the amplitude of each sample is compared to a scale of discrete values and assigned the closest value. This rounding off process is called quantizing. Each pulse now with its discrete value is then coded into binary form. These binary pulses are what appear on the transmission line.

These signals are readily repeated over the telephone communication system by the use of regenerative repeaters usually placed along the cable carrying the communication channel about every 6,000 feet. Because the information in the pulse code modulation system is transmitted in the form of binary pulses the repeater need only recognize the presence or absence of a pulse to regenerate a clean new pulse. Because of the lower signal-to-noise ratio required in regenerative systems relative to frequency division multiplex systems, large amounts of noise, interference and distortion can be tolerated.

In its normal operation a regenerative repeater looks at an incoming signal train and recreates new pulses in the same sequence as they were originally transmitted. If instead the repeater stores the pulses momentarily and then regenerates them in a different order a form of switching can be accomplished. For instance pulses originally representing channel four might be regenerated in a time slot allocated to channel seven.

Taken one step further a device might connect channel four's pulses from one system to channel seven's slots in another system. This could be used as a trunk switch operating in a pulse code modulated mode, without changing the information to audio frequencies just for the purpose of switching. Such a method of switching has a decided economic effect on pulse code modulation systems.

At the present time there are three basic types of exchange switching—manual, electromechanical and electronic. The electromechanical switch operates in response to the dial pulsing of the subscriber's telephone and is the most common method. In pulse code modulation transmission the signalling information is contained within the pulse train, and therefore arrives at the exchange at the rapid microsecond rate of the pulse code modulation signal itself. Thus with electronic switching devices available to match this speed all function can be carried out in phenomenal time. It is estimated that the entire process of switching might be accomplished in about 100 milliseconds.

Direct pulse code modulation switching offers more than speed. If signals are not demodulated for switching considerable economic gain as well as improved signal quality can be achieved. Terminal equipment conventionally contributes a large percentage of total system cost and most degradation in the system takes place in the terminals where signals must be transformed from one form to another. By utilizing pulse code modulation switching the number of terminal units required is substantially reduced. In its most elementary form pulse code modulation switching must detect a new call, absorb signal information and set up a path through the exchange to the outgoing system. In pulse code modulation switching routing involves not only finding a clear circuit leaving the exchange in the proper direction but also necessitates matching in time the two channels. After the information is switched out of an incoming pulse train a finite amount of delay is necessary to fit the signal into the proper time slot of the outgoing circuit.

A number of systems have been described suggesting various techniques for effecting switching of pulse code modulated signals without need for translating the systems into analog form. One of these is described by C. Dumousseau in a paper entitled "A Local Area Integrated PCM Telephone Network," in the IEEE Transactions on Communications and Electronics, No. 71, Mar. 1964, pages 158 to 162. Still another was described by D. J. Harding in "An Approach to a Tandem Exchange for an Integrated PCM Network," International Congress of Electronic Switching, Paris, 1966. A third is described by A. Chatelon in a paper entitled "PCM Telephone Exchange Switches Digital Data Like a Computer," which appeared in Electronics, Oct. 3, 1966, pages 119 to 126.

Because the switching of pulse code modulated signals is a relative new art, it is probably well at this time to define the general requirements of this technique and how these requirements have been met by the prior art.

A first general requirement of most such switching is that all information entering or leaving a switch have the same data rate. This insures that no data has been lost or added during channel switching or during the multiplexing process. If only digitally coded voice is being switched and if moderately accurate clocks are used, information is lost at a rate which is not noticeable upon decoding back to voice. However, if data is handled and especially blocks of data, the error rate becomes detrimental. Inasmuch as one of the particular advantages of pulse code modulation is the handling of data, it causes the specification of synchronous interconnected systems. One method employed can be termed as direct synchronism. Systems of this sort would employ slave clocks being synchronized to a master clock (homochronous) or the synchronization of all clocks mutually to each other (isochronous). Another class (quasisynchronous) is where the average frequency of all clocks over a period of time would be the same. This is usually achieved by adding or subtracting redundant pulse spaces to a frame until the information rate is within prescribed tolerance of the exchange clock, or having several clocks at each exchange or terminal and switching between them as the information rate goes out of tolerance with the receive terminal rate. Both of these methods require feedback between the sender and receive terminals.

Once synchronism has been achieved, the next requirement placed on signals inputted to the switch is that they be phase corrected or aligned with the clock in the exchange. This phase correcting can be done with phase shifters, variable delay lines, tapped delay lines, shift registers and memories. Depending upon the versatility of the time-division multiplex network employed, various degrees of alignment are required. It is possible to specify alignment to bit, channel or frame. Bit alignment requires that at some point in the system all inputted pulses are in phase with the system clock. Channel alignment requires that all channels inputted at a particular point in the system, are in phase with the system channels. This means that in addition to all pulses being in phase, that pulse positions of the channel are also in phase. When the system clock produces pulse position "1" of a channel, all terminals inputting at a point in the system produce pulse position one, although not necessarily of the same channel number. Frame alignment adds the additional requirement that they be of the same pulse position and of the same channel number. Clearly control of the time-division multiplex network is simplified if frame alignment is used. In most time-division multiplex networks there is a point where frame alignment exists.

The next requirement of a time-division multiplex network is that it must have the ability to reassign channels. If an interconnection is required between channel one of one terminal and channel 10 of another terminal for example, the network must be capable of accepting information during channel one and output it during channel 10. Since each terminal has separate send and receive lines this interconnection also requires the reverse assignment, that is, inputted channel 10 must be translated to outputted channel one. Channel reassignment is accomplished by a delay device either before the information enters the actual network or by delay device encountered as it passes through the network. Typically these delay devices may be memories, delay lines or shift registers.

An example of the first method of channel reassignment would have a memory with a capacity of 24 words at eight bits per word, at the input of the time-division multiplex network for each pulse code modulation terminal carrier. Inputted channels could be read thus into the memory as they arrived. Channel one would be read into word one, channel two into word two, etc. Each memory word would be read out and pulsed through the network during the translated channel slot. For example, if it is desired to interconnect channel one and 10, then during channel one time slot, the information is written into word position one of the memory. During channel time slot 10, this memory word is read out, switched through the network and outpulsed onto the pulse code modulated carrier terminal. In such a system frame alignment is required.

In a system such as this a principal disadvantage is that with a large number of originating and terminating pulse code modulated carrier terminals a probability of having to read two words out of one memory during the same channel time slot is quite high. Clearly if a total nonblocking system is defined as: during any time slot any channel from any terminal can be connected to any other terminal each memory word must have access to the network. In this case each 24-word memory would require 24 access points. Obviously the size of the time-division multiplex network becomes quite large and the advantage of the time-division multiplex network over a space-division network is considerably diminished. Based on traffic statistics and allowing some degree of blocking the number of required memory access points in the network is rapidly reduced. However, the network never reaches the minimal size that other techniques allow.

In the system described by Dumousseau techniques similar to that described above are employed. A memory is employed on the input and output of each network lead. This allows reducing the number of inputs to the time-division multiplex network to one per memory. Using input and output memories allows transferring of information through the network during any convenient time slot during which a path from the input memory to the output memory is not blocked.

This system configuration is nonblocking as long as there is an available input memory word and an available output memory word and, the system allows for reconfiguration of the network. This would mean reassignment of the time slots during which memory words are transferred across the network. For example, it is possible that when a new interconnection has been made between an input and output memory that there is no common time slot during which the two memories can be interconnected. By shifting or changing the time slots during which the input memory is being connected to the network a common time slot will be made available. This requires additional handling by the central processing unit which is not required in the present invention.

A second method for reassignment of channel slots is accomplished by delay cords located in the center of the network. These delay cords may be delay lines or shift registers. Translation of an input channel to an output channel occurring a number of channel time slots later is accomplished by connecting the input channel through a delay cord of the same number of channel delays. The delay cords appear in pairs. A channel of "N" delay time slots is accompanied by delay of (24–"") channel time slots. This second delay translates the output channel to the appropriate input channel time slot.

The network employed is a modified three-stage minimum contact network designed for a specific traffic load. This means that during a particular time slot only a limited number of accesses to the delay cords are provided. In addition this requires that the central processing unit has to look for open time slots in the output trunk. It also has to find a path with the appropriate delay period. These conditions contribute to potential blockage long before any sizable traffic density is reached. If, for example, a considerable number of calls have originated in a particular channel slot, eventually the limited access to the delay cords in that channel slot will be filled. Another call originated in that channel would be blocked because of no access, even though the traffic density has not begun to approach the capacity of the network. To eliminate this difficulty the central processing unit would have to inform the originating channel to reinitiate in a different channel. This requires more sophistication in the central processing unit and in the channel bank. Such blocking is not present in the present invention.

Another approach performs translation of the network as described above except the network is rectangular and the delay cords are memories. Super multiplexing is also employed. That is to say instead of handling eight bits in series through the network, they are handled in parallel. With eight pulses in parallel paths through the network in a pulse slot, it is possible to multiplex in a channel slot, of eight pulses, eight channel words. These words have the same channel number but are from eight different trunks. Again the possibility of premature blocking exists when any call is originated in the same channel slot position.

Prior art pulse code modulation switching systems suffer from many of the following inadequacies; they require additional memory to perform frame aligning, block prematurely due to many calls originating in the same channel slot, require reconstruction of the network when blocking occurs in the network, require added intelligence in the central processing unit and channel bank when premature blocking occurs in order to call for and reinitiate a call, and where channel translation occurs interior to the network, careful design of the network is required to account for the transmission delay of the various paths through the delay cords (or memories) and from there to the output.

SUMMARY OF THE INVENTION

Applicant's recognition of the deficiencies of prior art pulse code modulation switching systems results in the switching system according to the present invention which remedies many of these deficiencies by combining in the input memory the separate functions of channel alignment and channel translation. Additionally, a serial word of eight pulses is converted to a parallel word of eight pulses and writing into the memory during an unused pulse slot reduces the alignment criteria to one where only pulse alignment is required. Multiplexing of eight parallel words as demonstrated in the present invention reduces the size of the time-division multiplex network by a factor of eight.

By taking advantage of traffic when forming a trunk group the number of multiplexers appearing on the network is reduced, thus reducing the size of the network. Performing of channel translation with an input memory eliminates pseudoblocking that occurs in prior art systems. Applicant's use of reentrant memory increases the traffic handling capabilities of the network eliminating the need of reconfiguring the network if the path between a trunk group multiplexer and output trunk group is blocked. The ability to read from memory, multiple words during a channel slot reduces the number of leads a memory will otherwise require to connect into the network, and thus eliminates the need for memories on the output side of the network.

The forming of trunk groups by multiplexing provides a system that is easily expanded. In addition the ability to form trunk groups based on traffic handled by each trunk provides an efficient and easily adjusted system. As the traffic increases in a particular trunk group, that group can easily be split into two groups or otherwise be reconfigured to provide a more balanced load in each multiplexer.

DESCRIPTION OF THE DRAWINGS

The nature of the present invention and a better understanding of its operation will be had in the following detailed description taken in conjunction with the accompanying drawings in which.

DESCRIPTION OF THE PREFERRED EMBODIMENT

Figure 1:
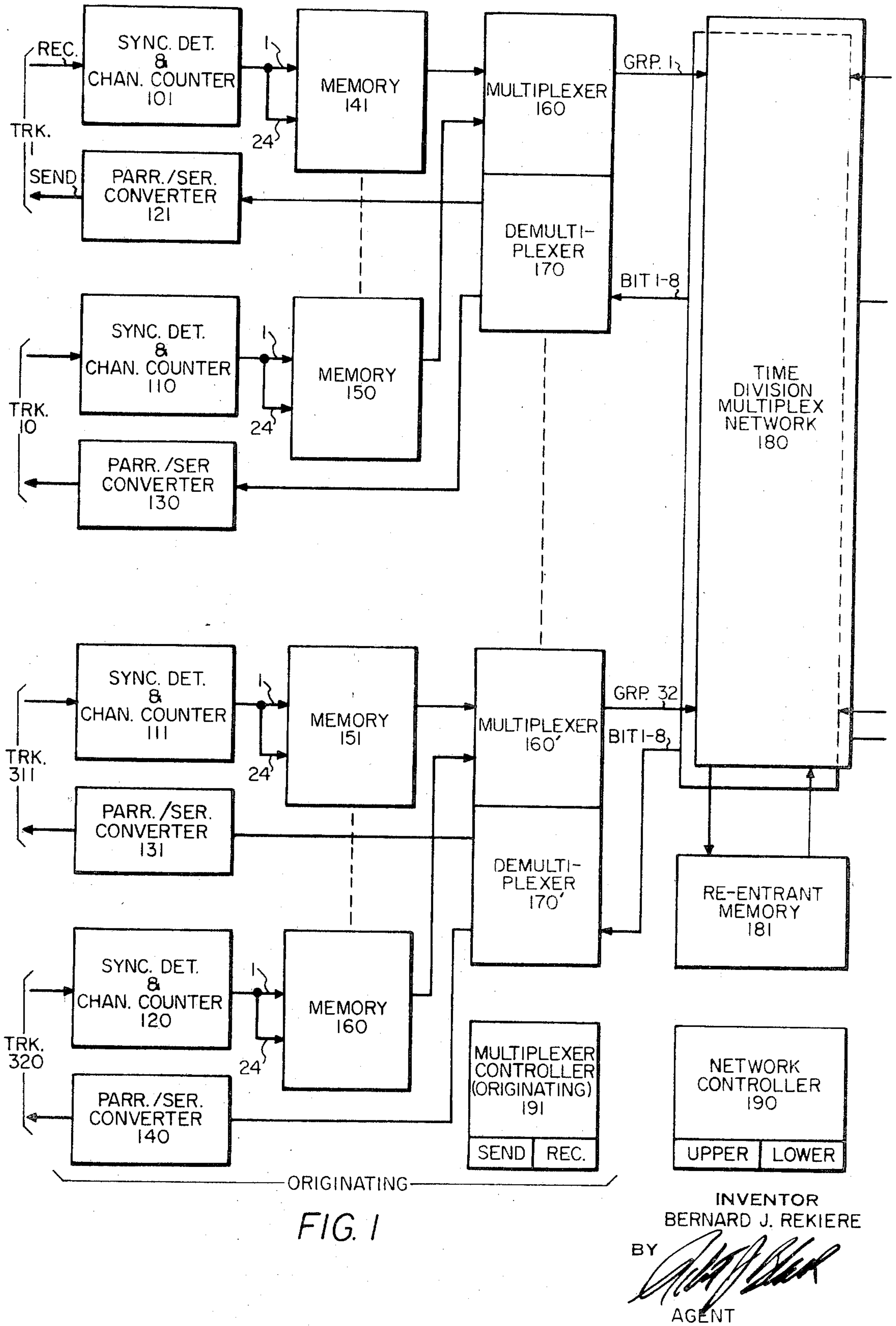
FIGS. 1 and 2 in combination comprise a block diagram of a switching system for use in a pulse code modulated transmission communication system, in accordance with the present invention.
Figure 2:
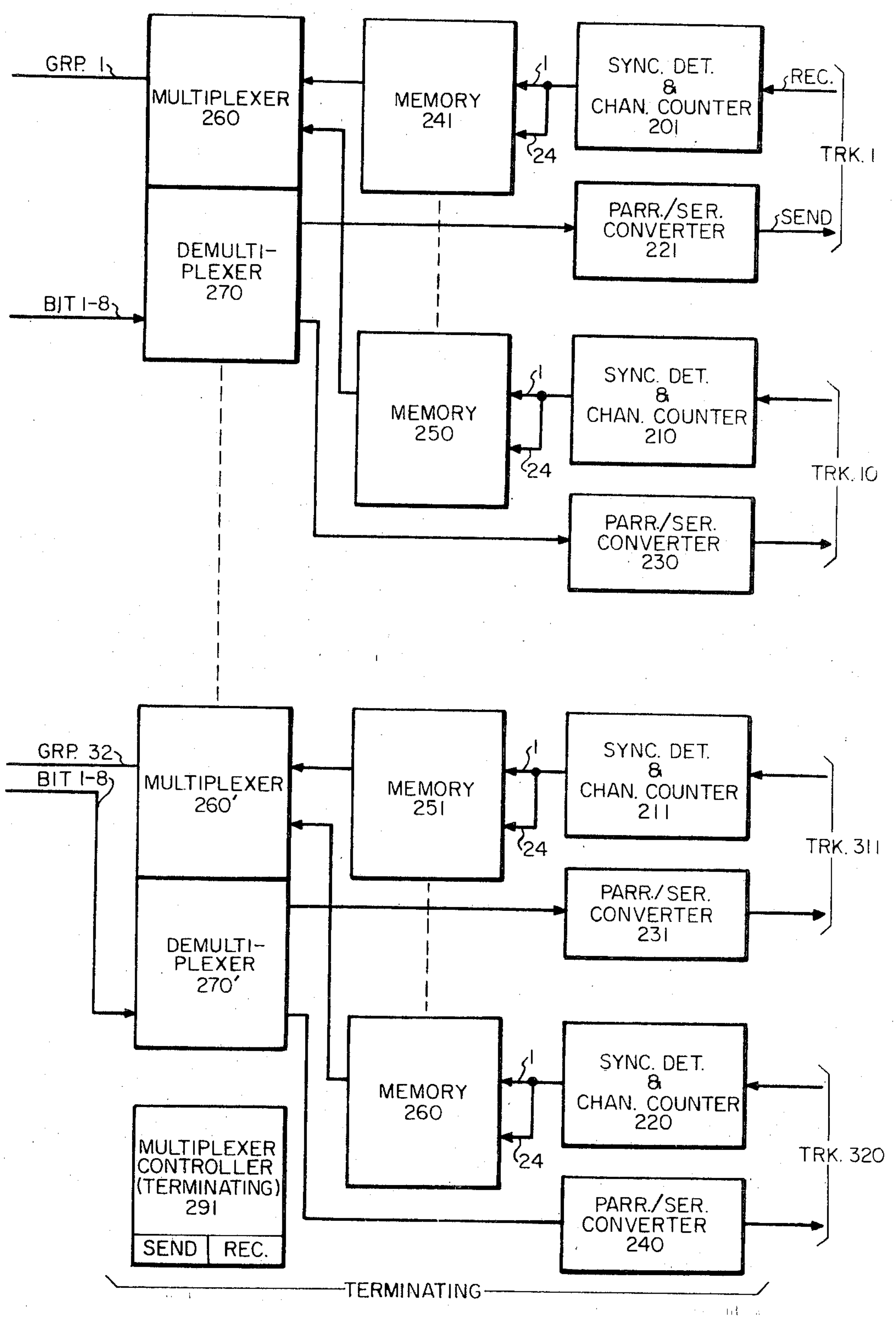

Referring now to FIGS. 1 and 2 taken in combination (with FIG. 2 placed to the right of FIG. 1), originating pulse code modulated carrier trunks appear on the left side of FIG. 1 as trunks 1 through 320 shown connected to the equipment of the present invention. Terminating trunks 1 through 320 inclusive have their appearances on the right-hand side of FIG. 2. In a practical embodiment of the present invention two-way trunks would have duplicated appearances, one on the originating side, the other on the terminating side.

It is also possible to handle a pulse code modulated carrier trunk of 24 channels which have even or odd channels or first group or last group of channels as originating or terminating only. This can be done by duplicating the appearances of all channels as in the case of two-way trunks or by splitting the groups in the synchronous detection circuit and routing them to the appropriate side.

The received pulse train enters the synchronous detector and channel counter circuit 101. In this circuit the incoming pulse train is phase aligned with the system clock. Alignment to pulse position is normally all that is required. However, depending upon the memory used alignment to channel position may or may not be required. In the synchronous detector and channel counter circuit 101, an eight bit serial-to-parallel register is provided to convert the eight serial bits to eight parallel bits. The channel counter monitors the framing bit position and keeps track of which of the 24 channels is being received. It is suggested that interoffice supervision be performed at this point. However, since supervisory requirements are not well defined in the industry at this time the details of this function are not included.

The received eight bits are transferred in parallel into a memory such as 141 during one pulse period. A memory word is also read out, in one pulse period, into the multiplexer 160. Precaution is taken to insure that the reading and writing of the same memory word does not occur in the same pulse period of the eight possible pulse periods of a channel slot. If the memory utilized has an extremely short cycle time a pulse period may be divided into both read and write time. During one channel slot, eight serial bits are accumulated in the synchronous detector circuit 101. These eight bits are transferred into another register and held during the next channel slot. It is during this next channel slot that there are eight opportunities provided to write the information into the memory 141. The read circuitry for the memory is monitored to insure that this writing operation does not coincide with reading. If during writing no transients are introduced into the memory that would prevent reading during the next pulse period, then synchronizing to pulse position is all that is required in the synchronous detector. If, however, transients do exist which inhibit reading during the next one or two pulse periods, then it would be desirable to have the transient occur during known pulse periods and prevent reading during this time. As mentioned earlier this memory form would require synchronizing to channel position.

Typically speaking, the memory 141 consists of capability for handling 24 words of eight bits each. The eight bits of channel one are stored in memory word one, channel two in memory word two, etc. The channel counter 101 is also the address register for writing into the memory 141. One memory (or memory block of 24 words) is provided for each input trunk of 24 channels. Memory 141 is read out in parallel during a single pulse period. Since eight pulse periods make up a channel slot eight memory words are multiplexed in time during a channel slot. As shown in FIG. 1 the group of 10 memories 141 through 150 inclusive are connected to multiplexer 160. Based on traffic considerations lighter or heavier loading might suggest the number of memories joined together and connected to a multiplexer be reduced or increased.

The eight words that are read out of the memories during a single-channel slot can come from any of the memory words and more than one word from one memory, depending upon traffic and the status of the time-division multiplex network 180. An extreme example might be all memories but one are not being read during one channel slot and all eight words came from that one memory. Any and all possible combinations are possible as long as only eight words are read at a given time.

The words are switched as parallel bits through the time-division multiplex network 180. The interconnection or paths through the network change with each pulse period. Eight bits in parallel move from left to right (originating to terminating) during a pulse slot and eight bits move from right to left (terminating to originating) in the same slot. The time-division multiplex network 180 may be visualized as a three-dimensional 32×32×16 lattice of cross-points in the examples shown in FIGS. 1 and 2. Here 32 is the number of the multiplex groups in the originating as 32 is also the number of multiplex groups on the terminating side and the 16 comes from eight parallel leads going from left to right plus eight parallel going from right to left through the network.

By using traffic statistics in forming the multiplexed group as opposed to using them to form the network a considerable savings in network size is effected. In the present example shown the 320 originating trunks each having 24 voice channels with a loading factor of 0.6 Erlangs, can handle a total of 4,608 Erlangs of originating traffic (320×24×0.6 Erlangs).

The parallel words are transferred through the time-division network 180 to the group demultiplexers such as 260 through 260' shown in FIG. 2. The demultiplexer such as 260 routes each parallel word to the parallel-to-serial converter such as 221 associated with the send portion of the trunk one terminal. This transfer of the parallel word occurs in the channel slot preceding the channel slot in which this word is to be outpulsed.

An additional memory called a reentrant memory such as 181, is provided with access into the time-division multiplex network 180. This memory is used to alleviate the possibility of blocking in the network. If, for example, a new call is originated in trunk one of originating group one and the only channel slot available on the terminating side is channel 14, then the eight bit information word must be transferred across the network during time slot 13. If, however, eight other words are being read through the group one multiplexer 160 during channel slot 13, then no pulse slots are available and the call is blocked. In this situation any empty pulse slot is picked in any available channel slot and the eight-bit word is transferred into the reentrant memory 181. This word can then be read from the reentrant memory 181 into channel slot 13, to the required trunk group and output trunk terminal. The reentrant memory shown 181 would be used for handling blocked words from the originating to terminating side. A separate similar reentrant memory would be required for words passing through the network from the terminating to the originating side.

Three control memories are required to control the present system. These are the multiplex controller (originating) 191, the multiplex controller (terminating) 291, and the network controller 190. Although each one is referred to as a memory each in practice may be several memories, with each memory physically associated with the equipment it is to control. For example, if we were to have 32 originating trunk groups it might be desirable to associate physically a multiplex controller memory with each of the 32 groups.

All the control memories would have a capacity of 192 words (24×8), one word for each pulse slot in each channel. Each word is read consecutively under control of the system channel and pulse counter. Word one would be read during channel one pulse slot one and word nine would be read during channel two pulse slot one, etc.

The originating and terminating multiplex controllers 191 and 219, respectively, perform identical functions and only the originating multiplex controller 191 will be described. Assuming we have assigned a control memory to each trunk group the multiplex controller performs the following. During each pulse slot one word is read. This word is divided into a send and receive portion. The send portion controls which word from this group is to be switched into the network. The receive portion determines which trunk of the group receives the word coming from the network. If binary decoding is used the send portion is $j$ bits long where $j$ is a whole number satisfying the inequality;

$$Z^j \geq 24N$$

$N$ in this case is the number of trunks in this group. The receive portion is $k$ bits long where $k$ is also a whole number satisfying the inequality:

$$Z^k \geq N$$

A word from the network controller 190 is divided into two portions, the upper and the lower. The upper portion controls the cross-points in the network which transfer information from originating to terminating. The lower portion controls the transfer of information from terminating to originating.

Implementation of the blocks shown in FIGS. 1 and 2 are dependent upon the particular electronic devices utilized. The following description of specific implementation of certain of these blocks is based upon the usage of integrated circuitry, alternate approaches can be easily conceived if one uses delay lines or discrete circuitry.

The synchronous detector and channel counters 101 through 110, 111 through 120, 201 through 210, and 211 through 220 inclusive are used to condition the pulse code modulated signal such that it may be loaded into the temporary storage memories such as 141, 150, etc. This conditioning is primarily of two forms. First, conversion of the bipolar pulse trains to unipolar and then conversion from serial-to-parallel information. In addition frame detection is performed in this section so that it is possible to identify as to pulse position and channel position the information currently arriving at the terminal.

Figure 3:
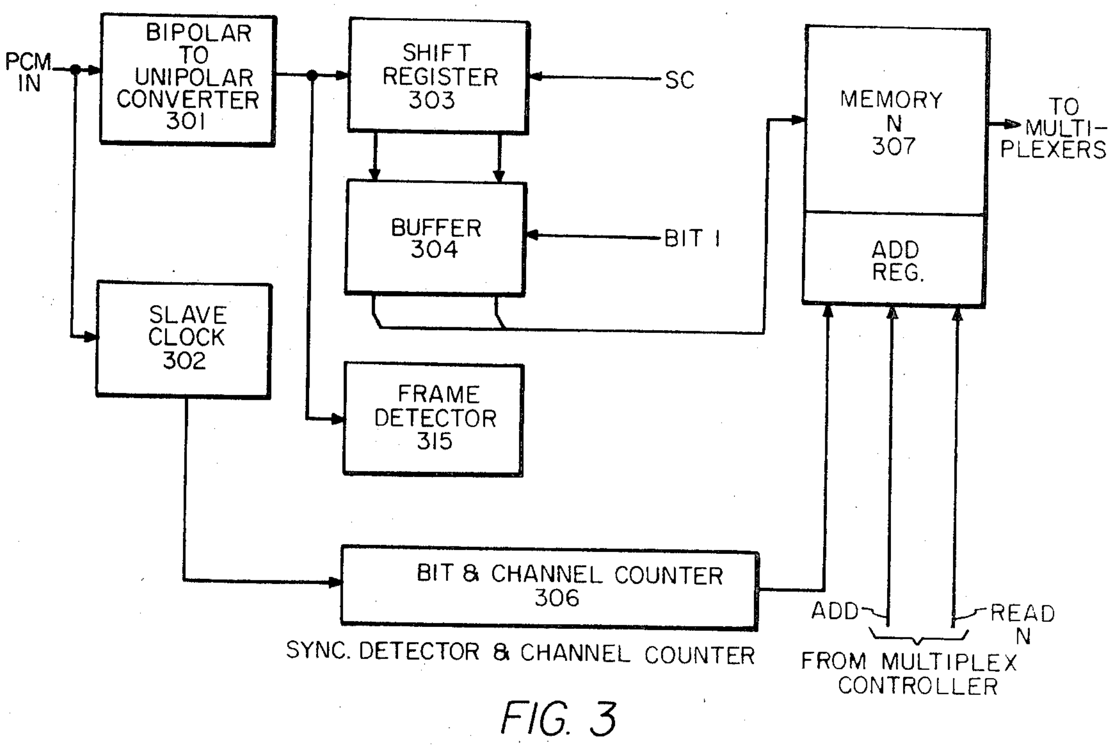
FIG. 3 is a diagram of the implementation of a synchronous detector and channel counter in accordance with the present invention.

Referring to FIG. 3 the block marked bipolar to unipolar converter 301 and slave clock 302, are descriptive of functions presently performed in pulse code modulation carrier systems such as that manufactured by Lenkurt Electric Co., Inc. and designated Type 91A. Circuitry that exists in Type 91A repeaters would be employed in these two blocks. The slave clock extracts timing information from the pulse code modulated line. This timing information is used to strobe the output of the bipolar to unipolar converter 301.

As each channel arrives it is reshaped and placed into the shift register 303. When eight bits have been collected in the shift register they are transferred into buffer 304. This transfer occurs during pulse position one of the timing interval of the following channel. The shift register 303 therefore must be of the form where information appearing at its output terminal does not change until the clock pulse returns to a zero state. One such type of shift register is known as a double rail register.

The output from the bipolar to unipolar converter 301 is also sent to the frame detector 305. Frame detector 305 looks for the framing pulse. Once it has found this pulse it initializes the bit and channel counter 306. From this time on the bit and channel counter 306 is in synchronism with the pulse code modulation information entering and is advanced by the slave clock 302. The information in the channel counter 306 is fed to the address register of memory 307.

It will be recalled that it was previously mentioned that channels are stored in the memory in a word position corresponding to the channel number. For example, channel one is stored in memory word position one, channel 12 in memory word 12, etc. Since the effect of converting from serial-to-parallel information results in a one channel delay, the channel counter address is decoded as being one channel number less than that counted. For example, if the channel counter presently contains the count of four, the buffer will contain information from channel three, therefore the address register decodes the number four in the channel counter to address memory word position three. During the interval of channel four corresponding to read pulse positions, the contents of buffer 304 are written into the memory 307. If the memory cannot be written into at the time it is being read, then the writing of the contents of the buffer into the memory must be inhibited while the memory is being read. This is accomplished by observing the READ N signal from the multiplex controller. This signal will access the memory 307 and indicate it is to be read during the next pulse position. However, since the buffer can be read in any one of the eight pulse positions available during a channel time, there would be seven other pulse intervals during which it can be written.

Memory 307 will be read into the time-division multiplex network 180 of FIG. 1 during a pulse position and a channel interval of time which has been selected by the multiplex controller to route information across the network. The address of the multiplex controller which determines what word is to be read out of the memory is sent to all memories within that group as noted previously. Since all 10 memories in a group are receiving the same address the signal READ N, for example, referring back to FIG. 1, selects memory 141 and indicates it is the one to be read during the following pulse position interval. This information is forwarded to memory 141 in the preceding pulse period in which it is to be read. This allows time for propagation and decoding. A multiplex controller observes the presence of the READ N signal and realizes that during the next pulse position the memory will be accessed and read into the time-division multiplex network. The controller will therefore know that the following pulse position interval should not be used to write the contents of the buffer into the memory.

Figure 4:
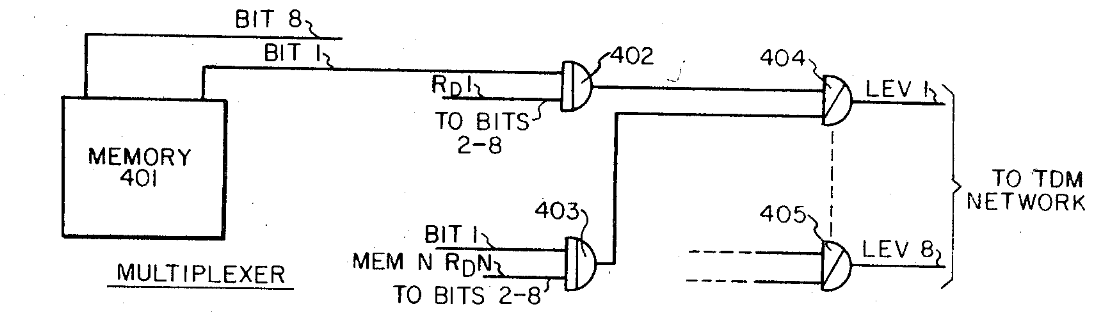
FIG. 4 is a diagram of the implementation of a multiplexer in accordance with the present invention.
Figure 5:
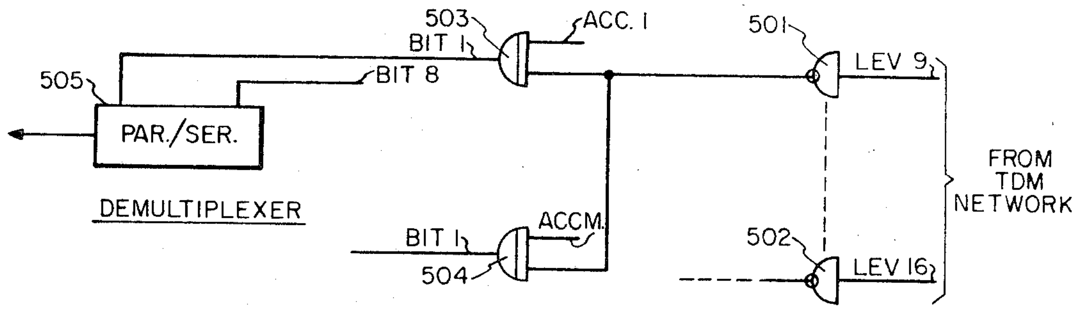
FIG. 5 is a diagram of the implementation of a demultiplexer in accordance with the present invention.

Referring now to FIGS. 4 and 5 a multiplexer and demultiplexer such as 160 and 170, respectively, are shown. For simplicity conventional symbols for AND gates and OR gates are used in this diagram.

As noted previously the time-division multiplex network is a parallel network in which the serial eight bits from a pulse code modulated carrier channel are switched in parallel across the network. The network consists of an upper sector and a lower sector with each sector containing eight levels as indicated in FIG. 4 and 5. Information from the memories in the group are gated to the multiplexer in FIG. 4 via the RDN signals. FIG. 4 shows the gating for bit position one of each memory. A similar gating arrangement exists for bits two through eight inclusive. The READ N signal is stored in the address register of each memory. This information plus the following pulse position is used to generate read RDN signals. This signal corresponds to the interval of time in which the memory is being read and information inputted to the multiplexer of FIG. 4. The RDN signal enables the AND gate such as 403 and allows the information to pass through the gate input OR gate into the time-division multiplex network.

On the return path, information gated from the time-division multiplex network is accepted and gated into one of the output parallel-to-serial converters such as 505 via the Accept or ACM M signal. The ACM M signal is presented from the multiplex controller. The multiplex controller is a memory giving 192 memory words of 13 bits per word. The number of bits per word would change as the number of maximum memories per group are implemented. To make the system modular the maximum number of bits per memory word would be available in each module.

Figure 6:
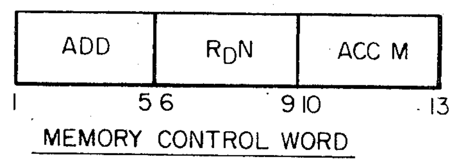
FIG. 6 is a diagram of the construction of a memory word as used in the present invention.

Referring now to FIG. 6 the first five bit positions contain the information ADD. This is a five-bit address which is sent up to all members in that group. The next bits six to nine inclusive contain the information READ N which will select one of the memories in the group to be accessed during the following pulse position. The following bits 10 and 16 contain the information ACC which is used to select one of the parallel-to-serial converters associated with each input and output pulse code modulated line. Again, since the parallel-to-serial converter results in the delaying of one channel, the information gated from the pulse code modulated channel to the parallel-to-serial converter is gated in a pulse position of a channel which precedes the channel in which this information should be outputted from the system. For example, if the information should be available to the output pulse code modulated lines during channel time four, the information would be gated from the time-division multiplex network during one of the pulse positions in the preceding channel (channel three). The pulse intervals will be selected by the network controller and conditioned upon the traffic presently in the time-division multiplex network. The memory word shown in FIG. 6 is required for each group. This memory can be located with the input line group or may be combined with several similar memories in a common multiplex controller. As in the present case if 32 groups are being controlled, memory words are extended by a factor of 32.

As noted previously the time-division multiplex network 180 of FIG. 1 carries information in the upper levels from the originating to the terminating side of the switch and the lower level from the terminating to the originating side. It should be pointed out that this information need not and in many cases will not correspond to the same conversation. The information is gated across (in either direction) the time-division multiplex network in the channel time which precedes the selected channel in which it is to be outputted. For example, if a call originated in channel six and it was determined that it should be routed through the time-division multiplex network and outputted in channel five the information would be stored in the originating memory until the originating channel four has reoccurred. At this time one of the eight pulse positions occurring in channel time four would be used to read the information from the memory and gated across the time-division multiplex network through the demultiplexer into the parallel-to-serial converter for that trunk position. The information would then be available to be outputted in channel five.

Supposing also that in the same originating group, but in a different trunk, a call originated in channel five would be routed to the same terminating group to be outpulsed during channel 10. This would then require that when information from the terminating channel 10 was received it would be stored in its memory and gated across the time-division multiplex network through the lower level in channel four. This information would then be available to the parallel-to-serial converter of the originating trunk group during channel five. If pulse position three of channel four was selected to handle these two calls then during this interval of time information from the originating channel six and information from terminating channel 10 would be gated across the network.

As noted previously during any one particular channel time only eight pulse positions are available to gate information through the multiplexer. Traffic conditions may evolve such that more words should be gated from the originating group or terminating group during a particular channel interval. The reentrant memory 181 of FIG. 1 is provided for this purpose. A better understanding of this memory, may be gained by reference to FIG. 7.

If a particular memory word should be taken across the network and outpulsed during a channel which is completely filled from this group, then during some other channel time, this information may be gated into the reentrant memory. This memory would then be used to access the network during the correct channel period. The reentrant memory is divided into three memory modules, module A is used to eliminate call congestion between the originating to the terminating side of the network. Module B is used to alleviate call congestion between the terminating and originating sides of the memory. The reentrant memory is composed of 192 words, the modules A and B each having eight words. Module C can be organized in several ways depending upon the degree of control to be added to the memory. The only basic function required in module C is to control the times or intervals during which module A and module B should be read from or written into. One bit is provided for each state, therefore each memory word in module C is a four bit word. As indicated in FIG. 7 the first tow bits control module A with the second two bits controlling module B.

Figure 7:
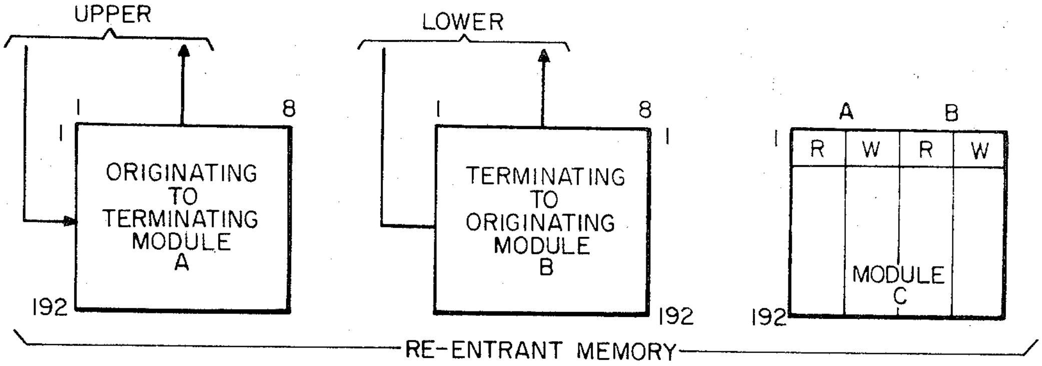
FIG. 7 is a diagram of the implementation of a reentrant memory in accordance with the present invention.

Referring to FIG. 7 module A is connected to the upper section of the time-division multiplex network. It will accept information from the originating memory through the upper time-division multiplex network. It will output the same information into the upper time-division multiplex network over to the terminating parallel-to-serial converters. Module B operates on the lower level of the time-division multiplex network in the same fashion. For example, if an originating memory has a memory word which must be outpulsed in channel five, and yet the multiplexer does not have an available pulse position during channel pulse four, this memory word can be gated in any channel time where a pulse position is available. For example, channel seven time could be selected during which this memory word would be gated into the reentrant memory. During the next frame when channel time four becomes available, the terminating memory would be read out and sent over to the terminating parallel-to-serial converter.

What is claimed is:

1. In a communication system a plurality of origination stations, a plurality of originating multichannel trunk circuits connected to said originating stations, digitally multiplexed signals initiated by said originating stations transmitted over said originating trunks, a plurality of terminating stations, a plurality of terminating multichannel trunk circuits connected to said terminating stations, digitally multiplexed signals initiated by said terminating stations transmitted over said terminating trunks, and switching means operated to connect certain ones of said originating stations to selected ones of said terminating stations over said trunk circuits; said switching means comprising: a time-division multiplex switching network operable to establish a plurality of selected circuit paths through said network; first input means connected between said originating trunks and said network; second input means connected between said terminating trunks and said network; first output means connected between said network and said terminating trunks; second output means connected between said originating trunks and said network; and control means comprising, a network controller periodically enabled to operate said time-division multiplex switching network, a first multiplex controller periodically operated to control the operation of said first input means and said second output means; a second multiplex controller operated to periodically control the operation of said second input means and said first output means; said time-division multiplex switching network including a plurality of parallel input paths and a plurality of parallel output paths, a plurality of parallel connecting paths periodically operated to complete a plurality of selected paths between said input and said output paths, whereby a plurality of said digitally multiplexed signals are conducted simultaneously through said network; and memory means connected to said time-division multiplex switching network operated to store digitally multiplexed signals received over said parallel input paths and further operated to transmit said stored signals over said plurality of parallel output paths.

2. Switching means as claimed in claim 1 wherein: said first input means include means for detecting a synchronizing signal received over said originating trunks and said second input means include means for detecting a synchronizing signal received over said terminating trunks.

3. A switching system as claimed in claim 1 wherein:
said first input means include means for identifying and counting the number of channels received over said originating trunks; and said second input means include means for identifying and counting the number of channels received over said terminating trunks.

4. A switching system as claimed in claim 1 wherein:
said first input means include first means for storing digitally multiplexed signals received over said originating trunks; and said second input means include second means for storing digitally multiplexed signals received over said terminating trunks.

5. A switching system as claimed in claim 1 wherein:
said first and second input means each include a serial-to-parallel converter.

6. Switching means as claimed in claim 4 wherein:
said first input means include first multiplexing means connected between said first storage means and said network, operated periodically to conduct a portion of the signals stored in said first storage means to said network; and said second input means include second multiplexing means connected between said second storage means and said network, operated periodically to conduct a portion of the signals stored in said second storage means to said network.

7. Switching means as claimed in claim 1 wherein:
said first output means include a first parallel-to-serial converter connected to said terminating trunks, and said second output means include a second parallel-to-serial converter connected to said originating trunks.

8. Switching means as claimed in claim 7 wherein:
said first output means include first demultiplexing means connected between said network and said first parallel-to-serial converter, said first demultiplexing means operable to periodically connect the output of said network to said first parallel-to-serial converter, and said first parallel-to-serial converter operated in response to receipt of parallel signals from said demultiplexer to convert said signals to serial form, and transmit said signals to said terminating trunks; and said second output means include second demultiplexing means connected between said network and said second parallel-to-serial converter, said second demultiplexing means operable to periodically connect the output of said network to said second parallel-to-serial converter; said parallel-to-serial converter operated in response to receipt of parallel signals from said second demultiplexing means to convert said signals to serial form and transmit said signals to said originating trunks.

* * * * *